Dec. 4, 1962     G. A. TINNERMAN     3,066,903

MOUNTING CLIPS OR CLAMPS

Filed Jan. 27, 1960

INVENTOR
GEORGE A. TINNERMAN

BY: *Featherstonhaugh & Co.*
ATTORNEYS

United States Patent Office 3,066,903
Patented Dec. 4, 1962

3,066,903
MOUNTING CLIPS OR CLAMPS
George A. Tinnerman, 17864 Beach Road,
Lakewood 7, Ohio
Filed Jan. 27, 1960, Ser. No. 5,073
3 Claims. (Cl. 248—300)

This invention relates to mounting clips or clamps and is a continuation-in-part of application Serial No. 597,284, filed July 11, 1956, and now abandoned.

Mounting clips have been employed in various fields embodying pairs of metal elements having an anchoring means on one end and lugs on the other, usually connected together by means of a nut and bolt, the tightening of which applies the necessary tension for holding the object which is to be mounted or secured. Such clips are sometimes cumbersome to work with and require time to secure since it is necessary to thread the bolt through the orificed lugs and then apply a nut which has to be tightened to obtain the required tension. Moreover in this respect it is obvious that they require extra elements besides the clip, i.e. nut and bolt, to effect securement, whereas it is obvious also that time is often lost in positioning the bolt and applying the screw because such parts are often dropped during the operation and are sometimes misplaced.

The present invention provides a clip which obviates these disadvantages of this prior type and provides in one simple element, a mounting or securing clip which involves two arms which are fastened in tension in a very simple operation, the arms being in effect reversed in relation to one another to form complementary engageable members.

The invention generally comprises a mounting clip formed from a strip of material bent upon itself to form a base at one end and a body rising therefrom in the form of spaced apart arms having free terminal ends being adjacent said ends to form offset tension applying shanks and coupling elements angularly disposed with respect to said shanks, said coupling elements being orificed, at least one coupling element having a lug upstanding from the plane thereof substantially aligned with the orifice of the other coupling element, said lug having an edge inclined rearwardly and upwardly in a direction away from the free end of its coupling element to form a shoulder towards the opposite end of said coupling element, said inclined edge forming a guide to bear against the inner face of said other coupling element as to guide said shoulder within the orifice of said other coupling element when said shanks are pressed towards one another to cause said coupling elements to lap with one another, and securing means on the opposite end of said clip, said arms being designed to embrace therebetween an object to be engaged when said coupling elements are interlocked with one another.

The invention will be clearly understood by reference to the following detailed specification taken in conjunction with the accompanying drawings.

Figure 1:
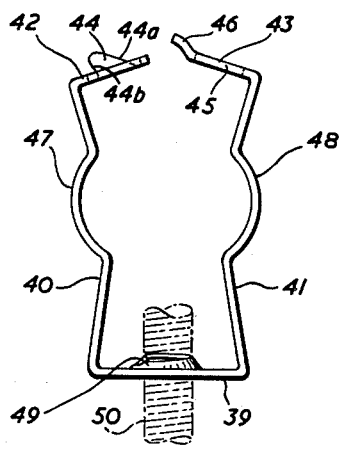
FIG. 1 is a side elevation of a unitary clip according to the present invention formed with interlockable ends in a position prior to engagement with one another and also illustrating a manner of securing the clip on a mounting.
Figure 2:
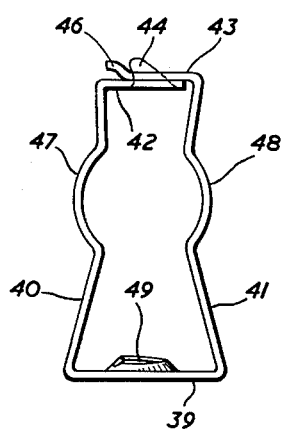
FIG. 2 shows the clip of FIG. 1 with its ends interlocked.

Referring to the drawings, and first of all to FIGS. 1 and 2, A indicates a strip of resilient formable material such as metal bent upon itself to provide a base 39 at one end and a body formed by arms 40 and 41 terminating in the coupling elements 42 and 43 at the opposite end. The coupling element 42 is formed with a lug 44 which is punched from the strip projecting substantially normal to the plane of the coupling element 42 and positioned to one side of the orifice thus formed in coupling element 42 in a manner similar to the orifice and lug formation shown in FIGS. 3 and 4 to be referred to hereinafter. The lug 44 as shown has an inclined free edge 44a rising upwardly from the plane of the coupling element 42 in a direction rearwardly from the free end of said coupling element to a point of maximum height towards the opposite end of said coupling element and then extends downwardly to the plane of the coupling element 42 to form a shoulder 44b remote from the free end of said coupling element. The inclined free edge of lug 44 provides a guiding edge engageable with the underside of coupling element 43 finally to guide the orifice 45 thereof into interlocked engagement with the lug 44 (as shown in FIG. 2) when the arms 40 and 41 which are spring tensioned away from one another are pressed towards one another for effecting such interlocking engagement. The orifice 45 is disposed to overlie the theoretical longitudinal axis of the coupling element 43 and, therefore, is designed to register with the location of the lug 44 in the coupling element 42 which is designed to be disposed substantially in line with the longitudinal axis of the coupling element 42. Preferably the coupling element 43 is provided with the offset tongue 46 which cooperates with the lug of the other coupling element in a guiding function and also provides for a levering means for separating the engaged ends of the clip when this is desired.

The arms 40 and 41 of the body may be offset in suitable manner, such as arcuately, indicated at 47 and 48, as to form a means of gripping an object such as a pipe, bar or the like whereas the base 39 may be orificed at 49 in the manner of a sheet steel nut as to provide for threaded engagement with a screw shank or the like 50 of a bolt or other member which may constitute a means of suspending or otherwise mounting an object by means of the clip on a support such as a bar or the like. The offset portions 47 and 48, of course, need not be arcuate but could be of other shape and, conversely, could be inwardly bowed or formed for gripping purposes.

It It is obvious, therefore, that the mounting clip described is extremely simple in construction and is adapted to perform a clamping or coupling function effected in a particularly simple manner. Moreover, it is obviously of a character which lends itself to easy manufacture for automation and may be adapted to many clamping or securing uses.

Figure 3:
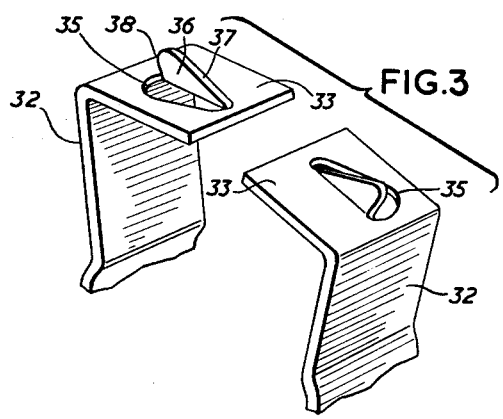
FIG. 3 is an enlarged fragmentary view of an alternative formation of the ends of the arms of a clip of FIG. 1 illustrating complementary formations in each.
Figure 4:
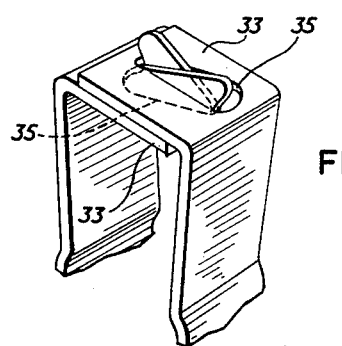
FIG. 4 is a similar view showing the ends of the arms interlocked with one another.

In the alternative form of construction illustrated in FIGS. 3 and 4, the arms 32 are formed similarly to arms 40 and 41 of FIGS. 1 and 2, each terminating in the coupling elements 33 bent from the plane of the arms 32 substantially at right angles thereto. Coupling elements 33 are punched or otherwise processed to form the elongated orifices 35 and the upwardly projecting locking lug 36. The orifices 35 are defined along one edge thereof by a straight edge parallel to the longitudinal axis of the clip and disposed slightly to one side of this theoretical axis so that the locking lug is, therefore, disposed to one side of, though closely adjacent to, the longitudinal center axis of the clip. Correspondingly, the orifice 35 of each clip overlaps and extends beyond the longitudinal axis of the clip and is of tapered shape as to provide in the lug 36 struck therefrom the gradually outwardly sloped edge 37 rising from the terminal end of the lug adjacent the free end of its coupling element to a point of maximum extent rearwardly thereof, thus providing a locking shoulder 38 at the opposite end of the lug. Accordingly, the coupling elements of these arms may be interlocked as shown in FIG. 4 in the same manner as that disclosed in FIGS. 1 and 2. By reason of the formation of the orifices 35 as above described which gradually increase in width from one end thereof to the other as to provide a passage in each coupling element 33 of substantial area, it is clear on the one hand that when the coupling elements 33 are lapped with one another as the arms 32 are pressed towards each other, one coupling element will ride over the inclined edge 37 of the lug of the other and the orifice of the overlying lug will always be guided finally to straddle the lug 36 of the underlying coupling element. When interlocked, as shown in FIG. 4, it will be noted that the locking lugs 36 lie side by side reversed to one another substantially along the center longitudinal axis of the clip, and the orifice 35 in the underlying coupling element is covered by a solid portion of the uppermost coupling element. Moreover, the orifice of the uppermost coupling element will overlie and expose a solid surface of the underlying coupling element. Consequently, the engaged coupling elements can be readily disengaged by inserting a tool, such as a screw driver, into the orifice of the uppermost coupling element and by pressure readily effect disengagement of the interlocked parts.

While it is preferred to form the clip from strip-like resilient material, it is obvious that it could be formed from resilient bar stock of somewhat small cross-section. Moreover, while such clip will generally be formed from spring steel, it is obvious that it may be formed from other materials practical to the intended purpose of use. It is, therefore, intended that the foregoing description should not be interpreted in a sense more limited than the subject matter defined by the appended claims.

What I claim as my invention is:

1. A mounting clip comprising a strip of material bent upon itself to form a base at one end and a body rising therefrom in the form of spaced apart arms having free terminal ends bent adjacent said ends to form offset tension applying shanks and coupling elements angularly disposed with respect to said shanks, said coupling elements being orificed, at least one coupling element having a lug upstanding from the plane thereof substantially aligned with the orifice of the other coupling element, said lug having an edge inclined rearwardly and upwardly in a direction away from the free end of its coupling element to form a shoulder towards the opposite end of said coupling element, said inclined edge forming a guide to bear against the inner face of said other coupling element as to guide said shoulder within the orifice of said other coupling element when said shanks are pressed towards one another to cause said coupling elements to lap with one another, and securing means on the opposite end of said clip, said arms being designed to embrace therebetween an object to be engaged when said coupling elements are interlocked with one another.

2. A clip as claimed in claim 1 in which the free end of said other coupling element is outwardly offset.

3. A mounting clip as claimed in claim 1 in which said arms are each bowed between said base and said free terminal ends, in opposed relation to one another, to embrace and grip therebetween an object to be engaged when said coupling elements are interlocked with one another.

References Cited in the file of this patent

UNITED STATES PATENTS

| | | |
|---|---|---|
| 165,407 | Dawson | July 13, 1875 |
| 1,379,476 | Parr | May 24, 1921 |
| 1,963,908 | Manasek | June 19, 1934 |
| 2,074,136 | Welch | Mar. 16, 1937 |
| 2,656,577 | Carbary | Oct. 27, 1953 |
| 2,817,129 | Roberts | Dec. 24, 1957 |